United States Patent
Kumar et al.

(10) Patent No.: US 10,961,894 B2
(45) Date of Patent: Mar. 30, 2021

(54) METHOD OF DETECTING AN EMULATOR FOR AN SCR CATALYTIC CONVERTER SYSTEM

(71) Applicant: Robert Bosch GmbH, Stuttgart (DE)

(72) Inventors: Modepally Kiran Kumar, Stuttgart-Weilimdorf (DE); Peter Huebner, Stuttgart (DE); Rui Qian, Leonberg (DE); Yujiang Xu, Wuxi (CN); Zhongzheng Liu, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 16/270,964

(22) Filed: Feb. 8, 2019

(65) Prior Publication Data
US 2019/0249585 A1  Aug. 15, 2019

(30) Foreign Application Priority Data
Feb. 12, 2018 (DE) .................. 10 2018 202 117.1

(51) Int. Cl.
G01M 15/10 (2006.01)
F01N 11/00 (2006.01)
G01M 15/04 (2006.01)

(52) U.S. Cl.
CPC ........... F01N 11/00 (2013.01); G01M 15/042 (2013.01)

(58) Field of Classification Search
CPC .. G01M 15/042; G01M 15/10; G01M 15/102; G01M 15/106; F01N 11/00

USPC ........................................... 73/114.75
See application file for complete search history.

(56) References Cited

U.S. PATENT DOCUMENTS

| | | | |
|---|---|---|---|
| 8,666,588 B2* | 3/2014 | Geilen | G07C 5/0808 701/29.6 |
| 2009/0049899 A1* | 2/2009 | Hjorsberg | F02D 41/1463 73/114.75 |
| 2011/0113753 A1* | 5/2011 | Christner | B01D 53/9495 60/274 |
| 2012/0041596 A1* | 2/2012 | Thompson | F01N 11/002 700/271 |
| 2012/0242361 A1* | 9/2012 | Kan | G01R 31/263 324/754.11 |
| 2013/0014575 A1* | 1/2013 | Levijoki | F01N 3/208 73/114.75 |
| 2013/0024066 A1* | 1/2013 | Geilen | G07C 5/0808 701/29.6 |
| 2013/0202506 A1* | 8/2013 | Pfister | B01D 53/9495 423/212 |
| 2013/0319070 A1* | 12/2013 | Klenk | G01N 33/00 73/1.02 |
| 2014/0196521 A1* | 7/2014 | Basu | G01N 33/2835 73/25.01 |
| 2017/0096927 A1* | 4/2017 | Giordano | F01N 3/208 |
| 2018/0095063 A1* | 4/2018 | Staller | G01N 33/225 |

(Continued)

Primary Examiner — Eric S. McCall
(74) Attorney, Agent, or Firm — Michael Best & Friedrich LLP (57) ABSTRACT

The invention concerns a method (200) of detecting an emulator for an SCR catalytic converter system (10) with the following steps: operating the SCR catalytic converter system (10) in a test state; and measuring a test variable of the SCR catalytic converter system (10); and deciding whether the test variable is behaving as for an SCR catalytic converter system (10) with or without an emulator.

6 Claims, 7 Drawing Sheets

(56) References Cited

U.S. PATENT DOCUMENTS

2019/0049341 A1\* 2/2019 Singh .................. G01M 15/104
2020/0095928 A1\* 3/2020 Huebner ............... F02B 77/086

\* cited by examiner

METHOD OF DETECTING AN EMULATOR FOR AN SCR CATALYTIC CONVERTER SYSTEM

BACKGROUND OF THE INVENTION

The present invention concerns a method of detecting an emulator for an SCR catalytic converter system, a computer program, a machine-readable memory medium and an electronic control unit.

Because of continuously increasing legal requirements on the emission values of combustion engines, to meet the specified limit values the exhaust gases from combustion engines are subjected to aftertreatment. To meet said limit values, exhaust gas aftertreatment systems downstream of the combustion engine are used, the aim of which is to reduce the particle and nitrogen oxide concentrations in the exhaust gas. The filter and catalytic converters used for this require that certain oxidation/reducing agents are introduced into the exhaust system.

Typically, such agents are hydrocarbons or urea-water solutions. Said hydrocarbons, such as for example diesel fuel, are used on the one hand for exothermal chemical conversion in an oxidation catalytic converter (DOC) with the aim of regenerating a diesel particle filter (DPF).

The reduction of the nitrogen oxide emissions of an internal combustion engine operating with excess air, in particular a diesel internal combustion engine, can be carried out using the so-called selective catalytic reduction technology (SCR). In this case, a reduction of nitrogen oxides to nitrogen and water vapor is carried out, wherein either gaseous ammonia or ammonia in an aqueous solution or urea in an aqueous solution are used as a reducing agent. The urea is used here as an ammonia carrier.

The urea is converted by means of hydrolysis to ammonia, which then in turn reduces the nitrogen oxide present in the exhaust gas in the actual SCR catalytic converter, which is also referred to as a DENOX catalytic converter.

The essential components of such a NOx reduction system are a reducing agent tank, a pump, a pressure regulator, a pressure sensor and a metering valve. The pump feeds the reducing agent stored in the reducing agent tank to the metering valve, by means of which the reducing agent is injected into the flow of exhaust gas upstream of the hydrolysis catalytic converter.

To the chagrin of the manufacturers of SCR catalytic converters, however, there are manufacturers of emulators of SCR catalytic converters, such as are used in trucks, for example. An emulator of this type can bypass all components of an SCR catalytic converter or take them out of service and can pass the signals of a properly working SCR catalytic converter to a control unit. An emulator of this type can for example emulate an SCR transport module, a metering valve or a metering module and sensors such as for example pressure, NOx, temperature or level sensors. The emulator produces no fault codes for the diagnostic tool of trucks of the prior art. Said emulators thus put the SCR technology out of action whilst simulating to the control unit that the SCR catalytic converter is working properly. Said fraudulent method saves refilling urea-water solutions, but damages the environment and the reputation of manufacturers of SCR catalytic converters

SUMMARY OF THE INVENTION

The method is used to detect an emulator for an SCR catalytic converter system. According to a first step of the method, the SCR catalytic converter system is operated in a test state. A test state is characterized in that a test variable can be measured, a measurement result of which distinguishes an SCR catalytic converter system with an emulator from an SCR catalytic converter system without an emulator.

According to a second step of the method, a test variable of the SCR catalytic converter system is measured.

According to a third step of the method, it is decided whether the test variable is behaving as for an SCR catalytic converter system with or without an emulator.

The method has the advantage that the use of an emulator for an SCR catalytic converter system can be detected.

If it has been decided during this that the test variable is behaving as for an SCR catalytic converter system with an emulator, then an emulator has been detected in the SCR catalytic converter system.

According to a preferred embodiment, the operation of the SCR catalytic converter system in the test state is carried out by setting a specified time profile of a setpoint pressure value and the test variable of the SCR catalytic converter system is a profile of the pump pressure signal in the SCR catalytic converter system.

This feature is based on the knowledge that an emulator for an SCR catalytic converter system plays back specified data stored in the emulator, i.e. reproduces said data to the control unit. Thus, it is not possible for the emulator to reproduce any pressure profiles. This feature exploits this and detects whether an emulator is present or not by setting specified time profiles of a setpoint pressure value.

According to a preferred embodiment, the operation of the SCR catalytic converter system is carried out in the test state by a control unit switching off either a pump or a metering module of the SCR catalytic converter system.

According to said embodiment, the test variable of the SCR catalytic converter system is a profile of the pump pressure signal in the SCR catalytic converter system. If the pump pressure signal is approximately equal to the ambient pressure, it is decided that the test variable is behaving as for an SCR catalytic converter system without an emulator, and if the pump pressure signal is not approximately equal to the ambient pressure, it is decided that the test variable is behaving as for an SCR catalytic converter system with an emulator.

According to a preferred embodiment, a Fourier component of a Fourier transform of a pressure profile is determined at a specified frequency, both if a control unit of the SCR catalytic converter system receives a signal that an oscillation-inducing component of the SCR catalytic converter system is operating, and if a control unit of the SCR catalytic converter system receives a signal that the oscillation-inducing component of the SCR catalytic converter system is not operating. Here the test state is the state in which the oscillation-inducing component is operating or not operating.

If on the one hand the Fourier component of the Fourier transform of the pressure profile at the specified frequency for the case in which the control unit of the SCR catalytic converter systems is receiving a signal that the oscillation-inducing component of the SCR catalytic converter system is operating is less than or equal to the Fourier component of the Fourier transform of the pressure profile at the specified frequency for the case in which the control unit of the SCR catalytic converter system is not receiving a signal that the oscillation-inducing component of the SCR catalytic converter system is operating, and if on the other hand the oscillation-inducing component is operating properly, according to said embodiment it is decided that an emulator is being used.

Said feature is based on the knowledge that an oscillation-inducing component of an SCR catalytic converter system produces oscillations that have an effect on the pressure in the SCR catalytic converter system and appear as Fourier components in the Fourier transform of the pressure profile. If an emulator of an SCR catalytic converter system is used, there are no oscillation-inducing components, for which reason there can be no corresponding oscillations in the pressure profile of the SCR catalytic converter system. If the Fourier component of the corresponding oscillations thus has the same magnitude in both cases, then it can be concluded therefrom that in effect no oscillation-inducing component of the SCR catalytic converter system is connected, but that the corresponding signal is being provided by an emulator. Two Fourier components are of the same magnitude if the size of the difference of the two Fourier components is less than 0.5 Hz.

If the Fourier component at the specified frequency for the case in which the control unit is receiving a signal that the oscillation-inducing component is operating is less than for the case in which the control unit is not receiving a signal that the oscillation-inducing component is operating, then likewise there is in effect no connected oscillation-inducing component. In the case in which no oscillation-inducing component is connected, it must however be excluded that other system oscillations cause errors in the result. I.e. in this case the corresponding Fourier components are very small. In this case, for each of the two cases, because of the small size of the Fourier components it can already be concluded that no oscillation-inducing component is present. Said embodiment has the advantage that there does not have to be any intervention in the normal mode of the SCR catalytic converter system. Thus, it can be determined whether an emulator for the SCR catalytic converter system is connected or not during normal operation of the SCR catalytic converter system.

The oscillation-inducing component of the SCR catalytic converter system is preferably a pump or a metering module. Said components are usually the components of an SCR catalytic converter system that cause the largest oscillations. Said components are thus the ideal candidates for the test of whether an emulator is being used in an SCR catalytic converter system.

According to a preferred embodiment, the specified frequency is a frequency that originates from the oscillation-inducing component. This can be expressed as that the specified frequency is a natural frequency of the oscillation-inducing component.

It is further preferred that the specified frequency is the frequency with the largest Fourier component in the Fourier spectrum of the pressure profile that originates from the oscillation-inducing component. According to a further embodiment, the specified frequency can also have been determined by the manufacturer of the SCR catalytic converter system for another SCR catalytic converter system of a similar design. The specified frequency is a characteristic oscillation frequency of the oscillation-inducing component.

According to a preferred embodiment, the specified frequency is the lowest frequency in the Fourier spectrum that has a component that is significantly different from zero and that originates from the oscillation-inducing component.

The computer program is arranged to carry out each step of the method, in particular when it is run on an electronic control unit or computing unit. This enables the implementation of the method in a conventional control unit without having to carry out design changes for this purpose. The computer program is stored on a machine-readable memory medium for this purpose. By running the computer program on a conventional electronic control unit, the electronic control unit is obtained that is arranged to detect an emulator of an SCR catalytic converter system.

BRIEF DESCRIPTION OF THE DRAWINGS

Exemplary embodiments of the invention are represented in the drawings and are described in detail in the subsequent description.

DETAILED DESCRIPTION

Figure 1:
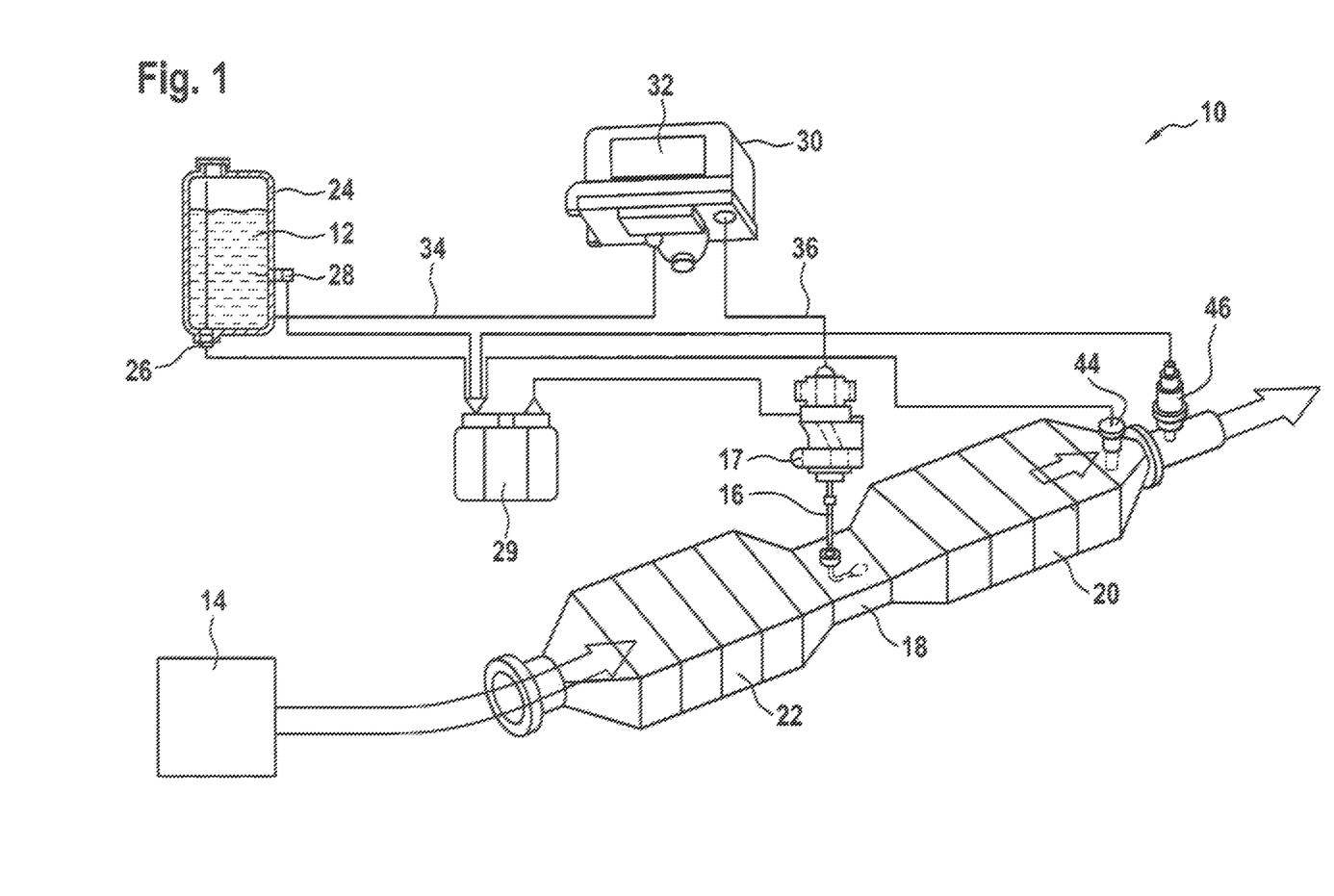
FIG. 1 shows schematically an SCR catalytic converter system with which the method according to an exemplary embodiment of the invention can be carried out.

An SCR catalytic converter system 10 with a metering device for metering urea-water solutions 12 into the exhaust system 18 of an internal combustion engine 14 (which is only indicated) of a motor vehicle is represented in FIG. 1. The SCR catalytic converter system 10 is used in a known way for the reduction of nitrogen oxides in the exhaust gas of the internal combustion engine 14 by means of selective catalytic reduction (SCR). For the reduction, urea-water solution 12 is injected as the reduction agent via a metering valve 16 of a metering module 17 into an exhaust system 18 upstream of the SCR catalytic converter 20 and downstream of an oxidation catalytic converter 22.

The urea-water solution 12 is stored in a storage tank 24 that comprises a level sensor 26 and a temperature sensor 28, each of which is connected to a control unit 29. The metering valve 16 of the metering module 17 is supplied with the urea-water solution 12 from the storage tank 24 by means of a transport module 30.

The transport module 30 comprises a transport pump 32 that extracts urea-water solution 12 from the storage tank 24 by means of a suction line 34. The urea-water solution 12 is passed through a pressure line 36 to the metering valve 16 of the metering module 17. The urea-water solution 12 is injected by means of said metering valve 16 into the exhaust system 18 between the internal combustion engine 14 and the SCR catalytic converter 20.

The transport pump 32 and the metering module 17 are controlled by the electronic control unit 29 during this. An exhaust gas temperature sensor 44 and an exhaust gas sensor 46, both of which are disposed downstream of the SCR catalytic converter 20, are also connected to the electronic control unit 29.

Furthermore, the control unit 29 is arranged to operate the SCR catalytic converter system 10, in particular the pump 32 of the transport module 30 and the metering module 17 of the SCR catalytic converter system 10, by means of the method according to the invention.

Figure 2:
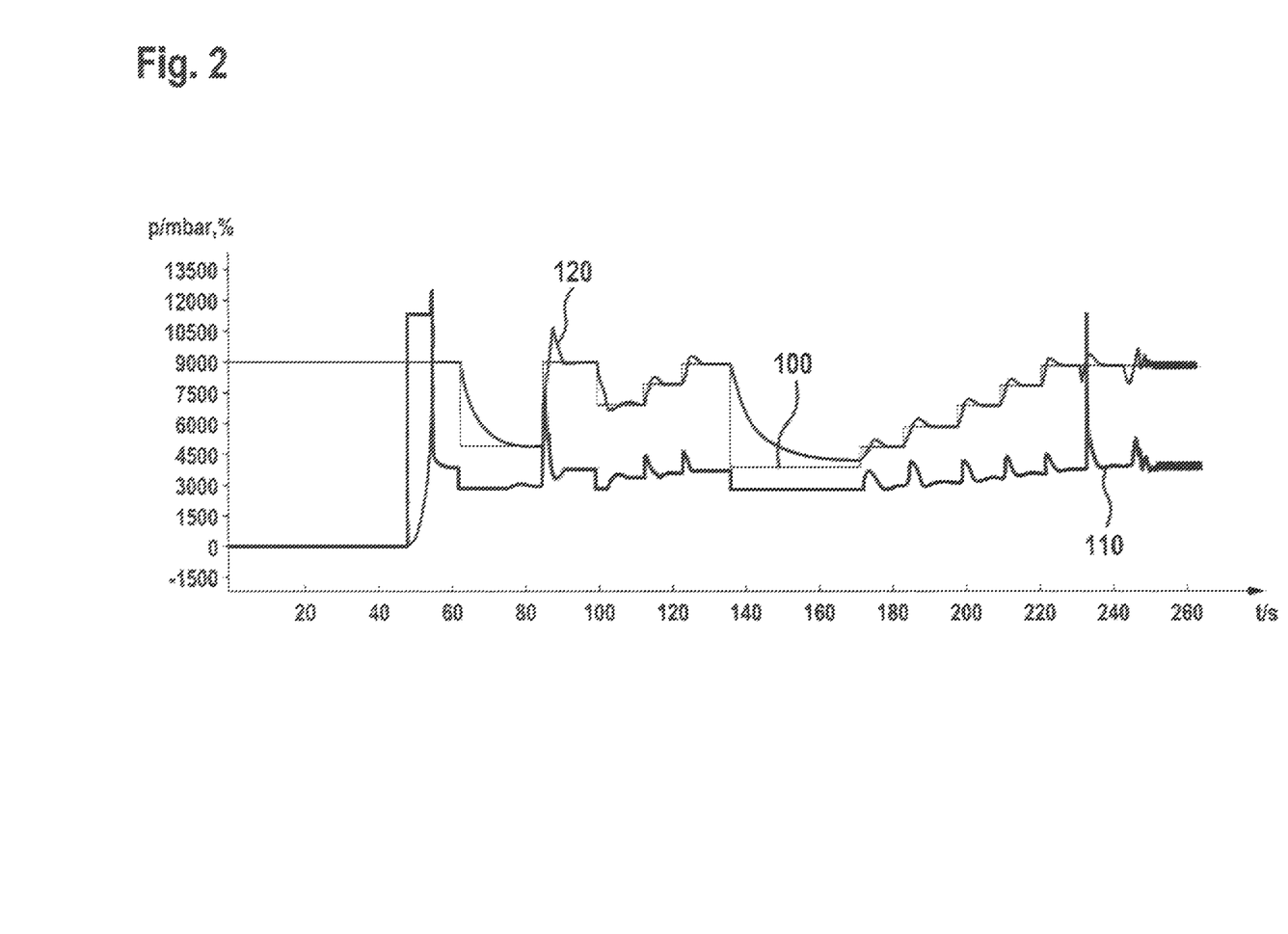
FIG. 2 shows a time profile of a setpoint pressure value, a pump actuation signal and a pump pressure signal of an SCR catalytic converter system without an emulator.

FIG. 2 shows a time profile of a setpoint pressure value 100, a pump actuation signal 110 and a pump pressure signal 120 of an SCR catalytic converter system 10 without an emulator. The pump pressure signal 120 is provided by a pressure sensor. On the abscissa axis, the time is plotted in seconds. On the ordinate axis, the setpoint pressure value 100 and the pump pressure signal 120 are plotted in millibars, while the pump actuation signal 110 is plotted in relative units, which is indicated by the % character.

After the start of the system, the pump pressure signal 120 increases and approaches the setpoint pressure value 100. Between seconds 50 and 60, the pump pressure signal 120 and the setpoint pressure value 100 have approximately the same value. After second 60, the setpoint pressure value 100 changes multiple times after a certain time and the pump pressure signal 120 follows the setpoint pressure value 100 after a settling period. After the setpoint pressure value 100 has changed in each case, a corresponding adjustment behavior is detected in the pump actuation signal 110, i.e. if the setpoint pressure value 100 has increased, the pump actuation signal 110 increases and if the setpoint pressure value 100 has reduced, the pump actuation signal 110 is smaller.

Figure 3:
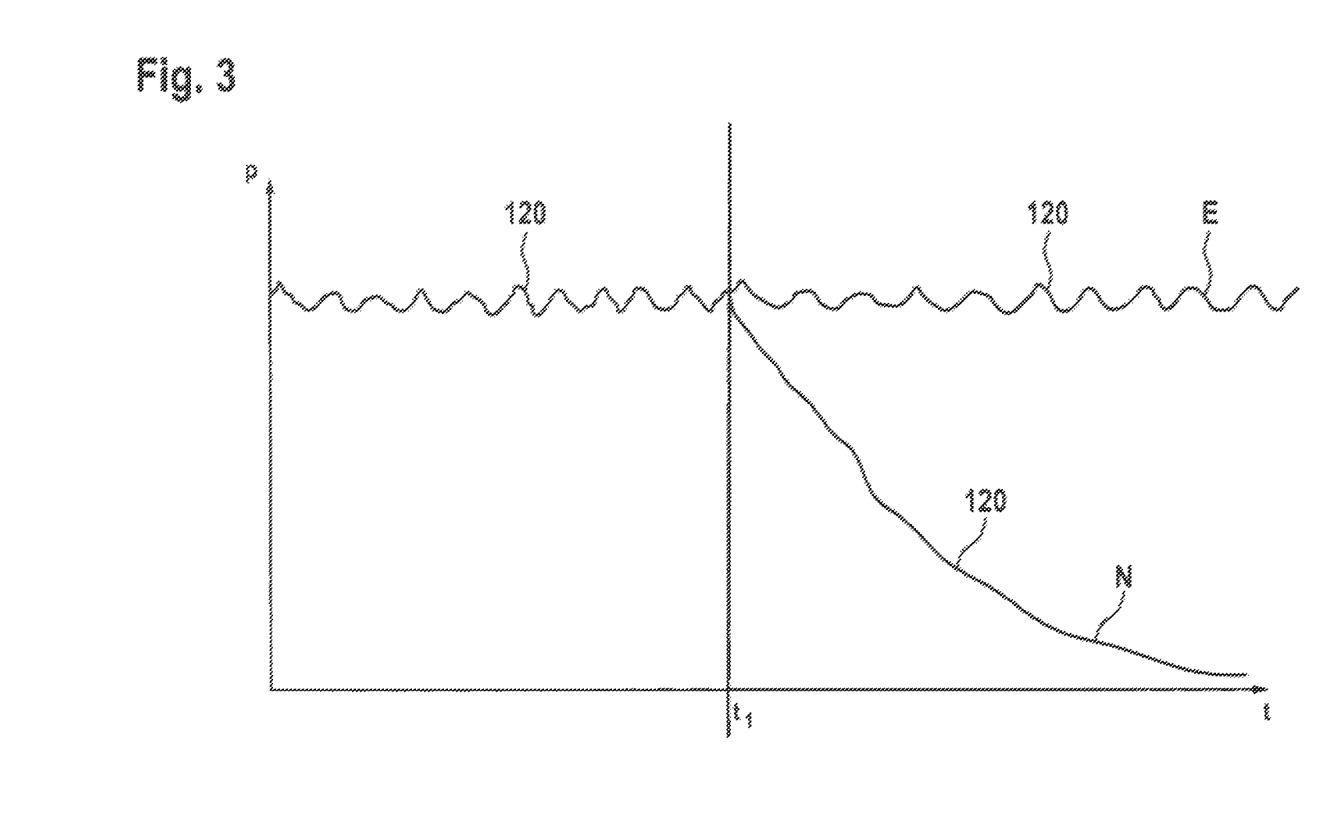
FIG. 3 shows a time profile of the pump pressure signal after a pump of a transport module or a metering module of the SCR catalytic converter system has been switched off both for the case in which an emulator is emulating the SCR catalytic converter system and for the case in which there is no emulator.

FIG. 3 shows a time profile of the pump pressure signal 120 after a pump 32 of a transport module 30 or a metering module 17 of the SCR catalytic converter system 10 has been switched off, both for the case in which an emulator is emulating the SCR catalytic converter system 10 and for the case in which there is no emulator. At the point in time ti, the control unit switches the pump 32 or the metering module 17 off. The pump pressure signal 120 time behavior does not change for the case in which an emulator is emulating the SCR catalytic converter system 10; this is the pump pressure signal 120, which is characterized by the letter E. On the other hand, the pump pressure signal 120 decreases to the ambient pressure for the case in which there is no emulator; this is the pump pressure signal 120, which is characterized by the letter N.

Figure 4:
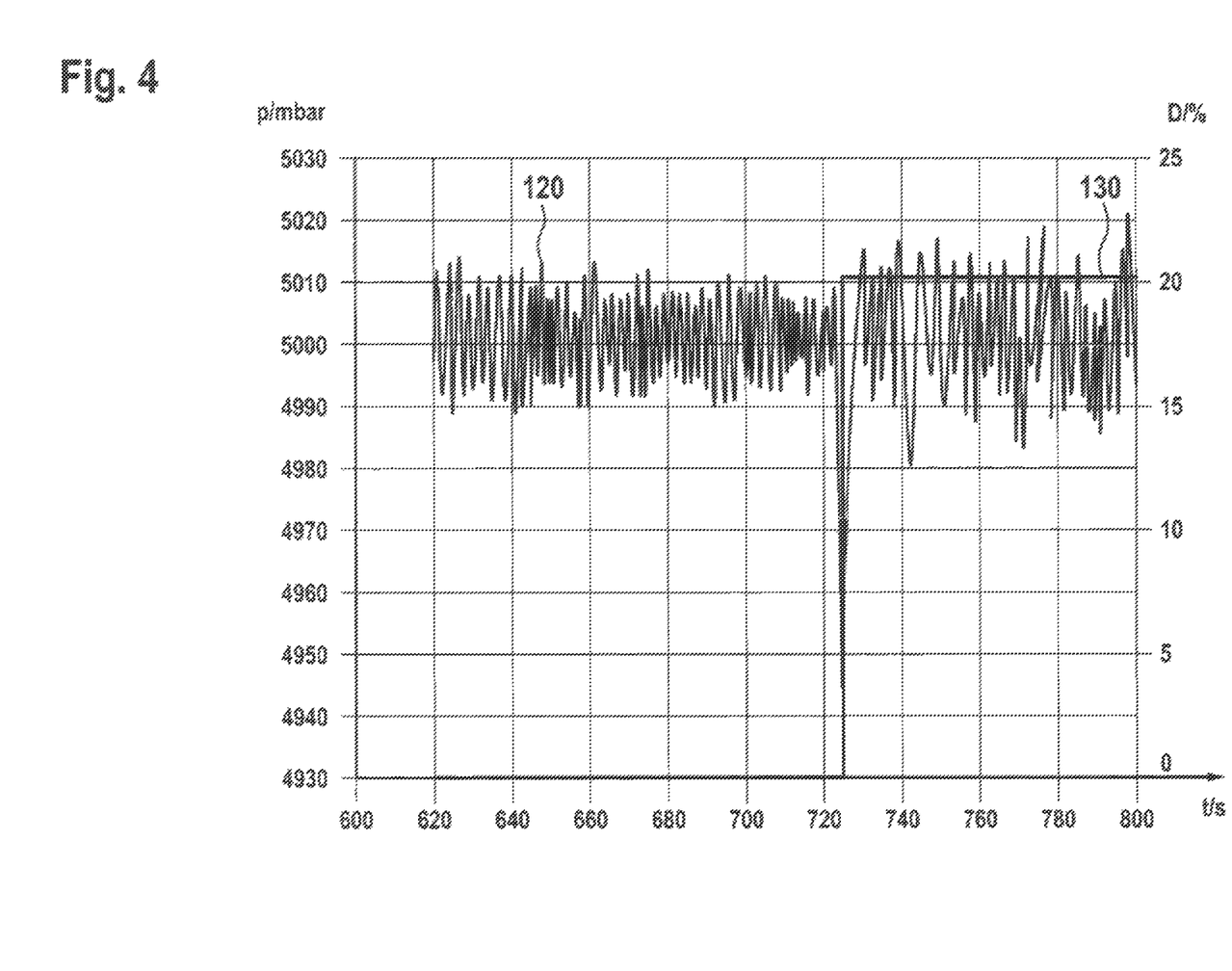
FIG. 4 shows the pump pressure signal and a metering signal of the metering module, which are plotted against time.

FIG. 4 shows the pump pressure signal 120 in millibars and a metering signal 130 of the metering module 17 in relative units, which is plotted against the time measured in seconds. After the metering signal 130 has been switched on at second 725, larger fluctuations than before can be seen in the pump pressure signal 120.

Figure 5:
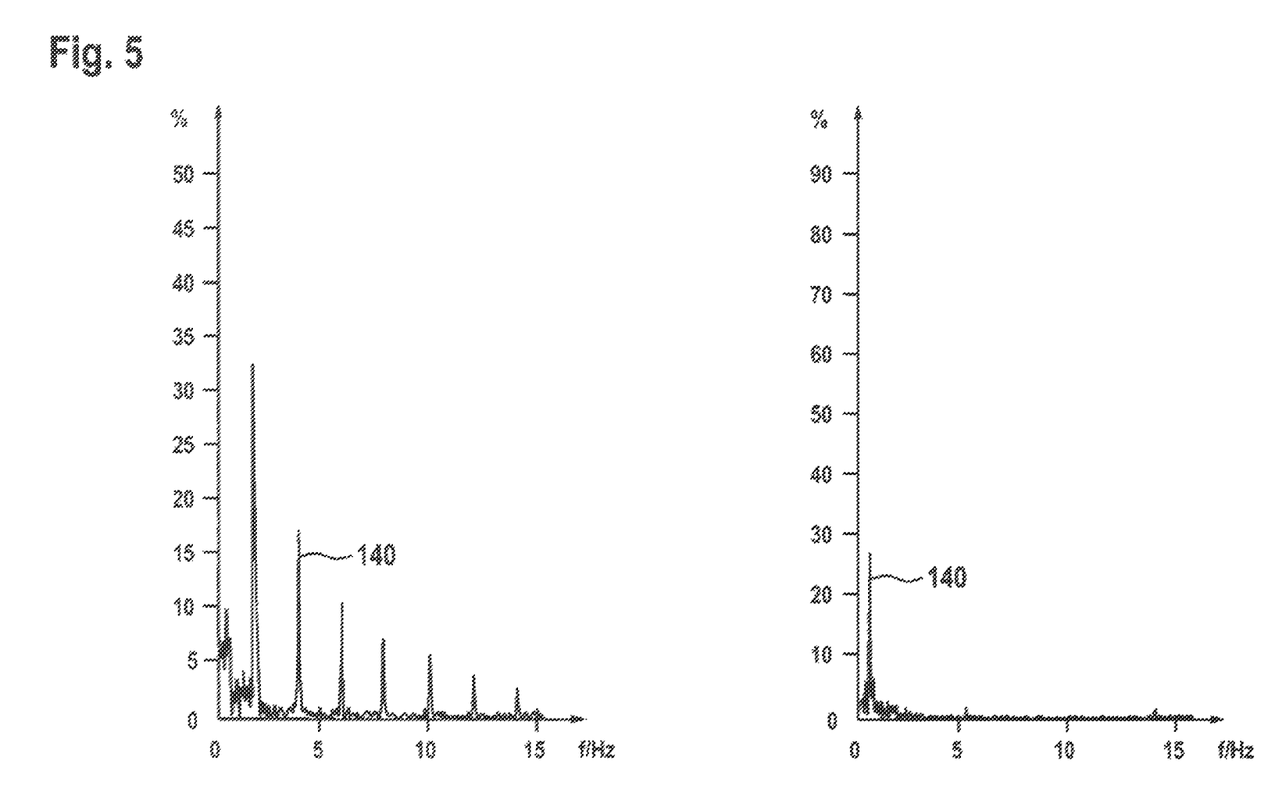
FIG. 5 shows two Fourier transforms, respectively of a pump pressure signal for the case in which the metering module is operating, and for the case in which the metering module is not operating.

FIG. 5 shows two Fourier transforms 140, respectively of a pump pressure signal 120 for the case in which the metering module 17 is operating, see left part of the figure, and for the case in which the metering module 17 is not operating, see right part of the figure. In the right part of the figure, which shows the case in which the metering module 17 is not operating, the Fourier transform 140 only comprises components at very low frequencies below 1 Hertz. On the other hand, the left part of the figure shows, in addition to the same components around 1 Hertz as in the right part of the figure, further significantly visible Fourier components at a frequency of 2 Hz and multiples thereof. If the control unit receives a signal that the metering module 17 is operating and at the same time there are no Fourier components as in the left parts of the figure in the Fourier transform 140 of the pump pressure signal 120, then there is the suspicion that an emulator is present.

Figure 6:
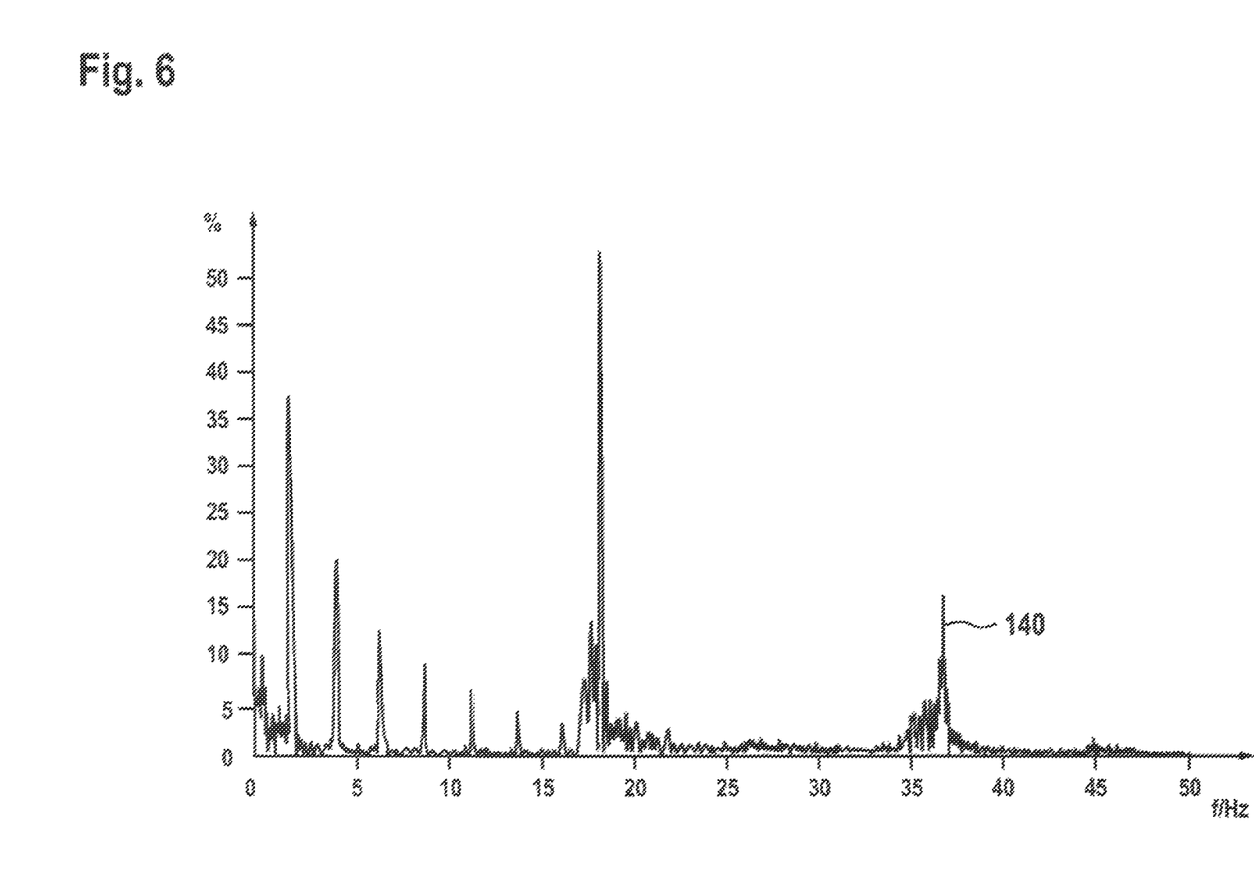
FIG. 6 shows a Fourier transforms of a pump pressure signal for the case in which the pump of the transport module is operating.

FIG. 6 shows a Fourier transform 140 of a pump pressure signal 120 for the case in which the pump 32 of the transport module 30 is operating. The Fourier components at approx. 18 Hz correspond to the rotation frequency of the motor of the pump 32. The Fourier components at approx. 36 Hz correspond to twice the rotation frequency of the motor of the pump 32. As the metering module 17 was operating at the same time during said measurement, the Fourier transform 140 also shows Fourier components at multiples of the operating frequency of the metering module 17, which corresponds to approximately 2 Hz.

Figure 7:
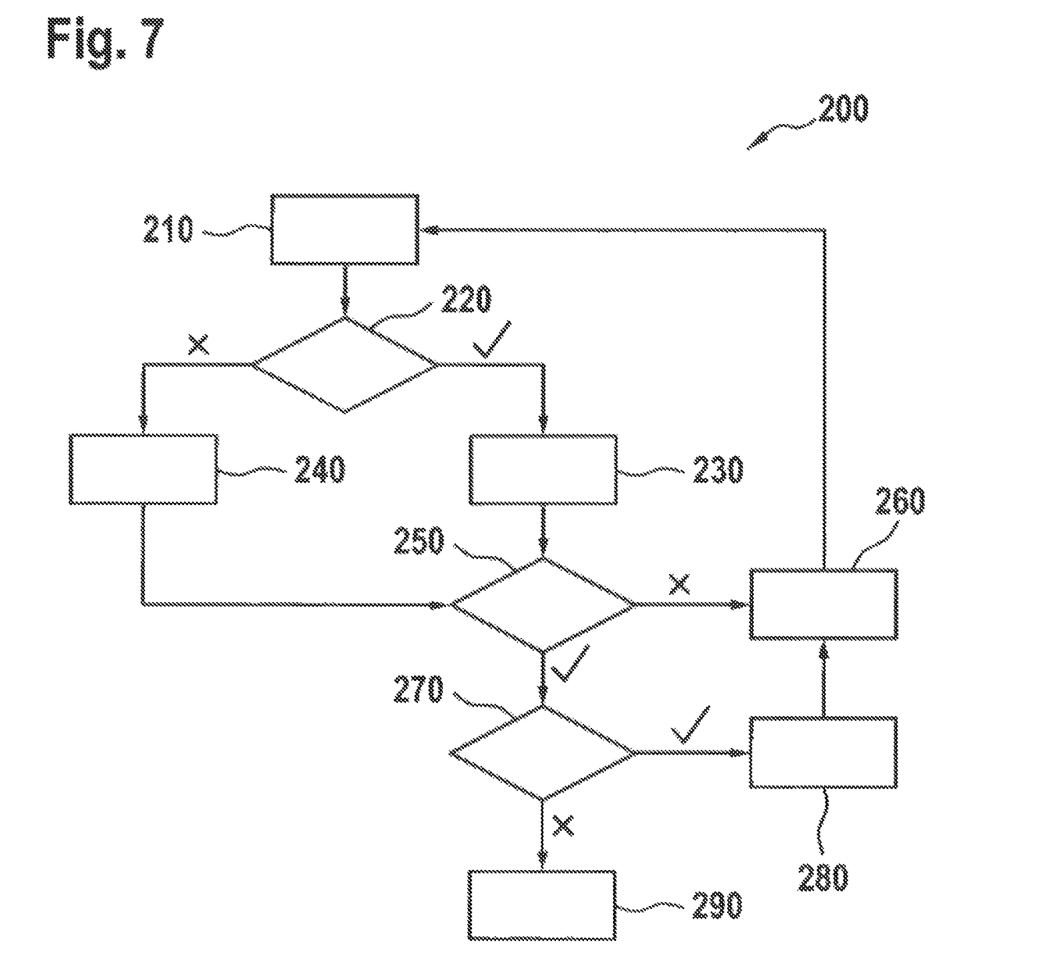
FIG. 7 shows a schematic flow chart of a method according to an exemplary embodiment of the invention.

FIG. 7 shows a flow chart of a method 200 of detecting an emulator for an SCR catalytic converter system 10. The method 200 starts at step 210. In step 210 a pump pressure signal 120 is transformed by means of a discrete Fourier transformation into a Fourier transform 140. In the subsequent step 220, a query is made as to whether an oscillation-inducing component of the SCR catalytic converter system was operating at the point in time of creating the Fourier transform 140. If this was the case, which is illustrated with a tick, the method 200 proceeds at step 230. If this was not the case, which is illustrated with a cross, the method 200 proceeds at step 240.

In step 230, the largest detected amplitude of the Fourier components at the specified frequency is stored as value B. The specified frequency depends on the oscillation-inducing component of the SCR catalytic converter system. If this is a metering module 17, then the value of the specified frequency is about 2 Hz; if the oscillation-inducing component is a motor of the pump 32 of the transport module 30, then the value of the specified frequency is about 18 Hz.

In step 240, the largest detected amplitude of the Fourier components at the specified frequency is stored as the value A.

The method continues from both step 230 and from step 240 at step 250, in which a query is made as to whether the value A equals the value B. If this is not the case, then the method continues with step 260. If this is the case, then the method continues with step 270.

In step 260, it is determined that no emulator has been detected. In the subsequent step, the method returns to step 210 and starts again from there.

If the method continues with step 270, i.e. for the case in which the value A equals the value B, the method 200 has detected no difference in the Fourier component for the case in which the control unit receives the signal that the oscillation-inducing component is operating and for the case in which the control unit receives the signal that the oscillation-inducing component is not operating. This can only mean that the oscillation-inducing component is not producing oscillations. The values A and B are seen as equal if the magnitude of the difference of the two Fourier components is less than 0.5 Hz.

In step 270, a query is made as to whether the component that is producing equality has a fault. If this is the case, then the method continues with step 280. If this is not the case, then the method continues with step 290.

In step 280, it is detected that there is a fault in the oscillation-inducing component, for which reason the values A and B are of equal magnitude. In the subsequent step the method continues with step 260, in which it is determined that no emulator has been detected.

In step 290, it is determined that an emulator has been detected.

The invention claimed is:

1. A method (200) of detecting an emulator for an SCR catalytic converter system (10), the method comprising:
operating, via a computer, the SCR catalytic converter system (10) in a test state by setting a specified time profile of a set point pump pressure value (100);
measuring, via the computer, a time profile of a pump pressure signal (120) in the SCR catalytic converter system (10) as a test variable of the SCR catalytic converter system (10); and
deciding, via the computer, whether the test variable is behaving as for an SCR catalytic converter system (10) operating with or without an emulator based on comparing the specified time profile and the measured time profile.

2. The method according to claim 1, wherein
the operation of the SCR catalytic converter system (10) in the test state is carried out by switching off a control unit of either a pump (32) or a metering module (17) of the SCR catalytic converter system (10); and
the test variable of the SCR catalytic converter system (10) is a profile of the pump pressure signal (120) in the SCR catalytic converter system;
wherein
if the pump pressure signal (120) is approximately equal to the ambient pressure, it is decided that the test variable is behaving as for an SCR catalytic converter system (10) without an emulator, and,
if the pump pressure signal (120) is not approximately equal to the ambient pressure, it is decided that the test variable is behaving as for an SCR catalytic converter system (10) with an emulator.

3. A method (200) of detecting an emulator for an SCR catalytic converter system (10), the method comprising:
determining a Fourier component of a Fourier transform (140) of a pump pressure profile at a specified frequency if a control unit of the SCR catalytic converter system (10) receives a signal that an oscillation-inducing component of the SCR catalytic converter system (10) is operating;
determining a Fourier component of a Fourier transform (140) of a pump pressure profile at a specified frequency if a control unit of the SCR catalytic converter system (10) receives a signal that the oscillation-inducing component of the SCR catalytic converter system (10) is not operating;
deciding that an emulator is being used if on the one hand the Fourier component of the Fourier transform (140) of the pump pressure profile at the specified frequency for the case in which the control unit of the SCR catalytic converter system (10) receives a signal that the oscillation-inducing component of the SCR catalytic converter system (10) is operating, is less than or equal to the Fourier component of the Fourier transform (140) of the pump pressure profile at the specified frequency for the case in which the control unit of the SCR catalytic converter system (10) is not receiving a signal that the oscillation-inducing component of the SCR catalytic converter system (10) is operating, and if on the other hand the oscillation-inducing component is operating properly.

4. The method according to claim 3, wherein the oscillation-inducing component of the SCR catalytic converter system (10) is a pump (32) or a metering module (17).

5. The method according to claim 3, wherein the specified frequency is a frequency that originates from the oscillation-inducing component.

6. A non-transitory, computer-readable medium containing computer-readable instructions that when executed by a computer cause the computer to detect an emulator for an SCR catalytic converter system (10) by
determining a Fourier component of a Fourier transform (140) of a pump pressure profile at a specified frequency if a control unit of the SCR catalytic converter system (10) receives a signal that an oscillation-inducing component of the SCR catalytic converter system (10) is operating;
determining a Fourier component of the Fourier transform (140) of a pump pressure profile at a specified frequency if a control unit of the SCR catalytic converter system (10) receives a signal that the oscillation-inducing component of the SCR catalytic converter system (10) is not operating;
deciding that an emulator is being used if on the one hand the Fourier component of the Fourier transform (140) of the pump pressure profile at the specified frequency for the case in which the control unit of the SCR catalytic converter system (10) receives a signal that the oscillation-inducing component of the SCR catalytic converter system (10) is operating, is less than or equal to the Fourier component of the Fourier transform (140) of the pump pressure profile at the specified frequency for the case in which the control unit of the SCR catalytic converter system (10) is not receiving a signal that the oscillation-inducing component of the SCR catalytic converter system (10) is operating, and if on the other hand the oscillation-inducing component is operating properly.

* * * * *